ELECTRON BEAM INTENSITY CONTROL CIRCUIT

Filed May 3, 1960

INVENTOR
J. LEVINSON
BY A. E. Hirsch Jr.
ATTORNEY 3,090,889

ELECTRON BEAM INTENSITY CONTROL CIRCUIT

John Levinson, Morristown, N.J., assignor to Bell Telephone Laboratories, Incorporated, New York, N.Y., a corporation of New York Filed May 3, 1960, Ser. No. 26,549
7 Claims. (Cl. 315—20)

This invention relates to apparatus for automatically regulating the intensity of a beam of electrons employed, for example, in the conventional scanning of the face of a cathode ray tube. More particularly, it relates to apparatus for automatically reducing the intensity of a cathode ray tube scanning beam in the event of deflection circuit failure and for automatically blanking the beam during retrace.

In a cathode ray tube, the impingement of the electron beam developed therein upon the fluorescent elements forming the face of the tube results in the emanation of light energy. The energy radiated by an individual element varies with the intensity of the beam and with the time during which the beam is focused upon the element. In the event that a failure occurs in the deflection circuit controlling the sweep of the electron beam across the face of the tube, resulting in a slowing down or cessation of the sweep, it is necessary to reduce the intensity of the beam to prevent burning of the fluorescent elements. It is also desirable to reduce the intensity of the scanning beam in a cathode ray tube during retrace of the beam across the face of the tube; i.e., after each active line sweep and after each active frame sweep.

Although devices are known for providing protection against burnout of the screens of cathode ray tubes in the event of deflection circuit failure, these devices typically utilize one or more charge accumulating elements. The time constants associated with such elements are generally such as to impart to these devices a relatively slow response. In fact, in the event of a circuit failure, partial burning of the screen may occur before the beam is blanked. Furthermore, due to their relatively slow response, these devices are not ordinarily used for blanking the beam during retrace, since the period for retrace may be much less than the response time.

The present invention embraces a single circuit that overcomes the above limitations and provides essentially instantaneous and automatic blanking of a cathode ray tube scanning beam, or the like, both during retrace and during those times in which the rate of deflection of the beam is less than some predetermined magnitude. In accordance with the invention, the rate and direction of deflection of the scanning beam are detected by sampling, for example, the energizing current or voltage in the deflection circuit. In the preferred embodiment of the invention this is accomplished by inserting the primary winding of a transformer in series with either or both of the magnetic deflection coils associated with the cathode ray tube. The magnitude of the potential developed in the secondary winding of the transformer is, accordingly, proportional to the rate of change of current in the deflection coils, and hence to beam velocity. The polarity of the developed potential is determined by the nature of the changing deflection circuit current, i.e., increasing or decreasing, and thus is indicative of the direction of deflection of the beam.

The developed secondary potential, which completely characterizes the deflection of the beam, is utilized to control an amplifier whose response is virtually instantaneous. The output of the amplifier, which is coupled to the beam intensity control grid of a cathode ray tube through a unidirectional current device, is made to assume effectively either a positive or negative potential.

The positive potential is assumed when the voltage developed in the secondary winding of the transformer is greater than a pre-established positive value of, for example, A volts, corresponding to a normal sweep speed sufficient to avoid burning the screen. When the output of the amplifier is positive, the unidirectional current device is biased to nonconduction to isolate a control element of the cathode ray tube from the amplifier, thus to allow the intensity of the beam to be controlled solely by an applied video signal. However, if the potential developed in the secondary winding of the transformer falls to a positive value less than A volts or becomes negative, corresponding to a substantially reduced sweep speed during active scanning, and to retrace deflections, respectively, the output potential of the amplifier is switched to its negative value. In this condition, the unidirectional current device conducts, and the control element of the cathode ray tube is clamped at the negative potential assumed by the amplifier, thus to blank the beam.

Although the invention has been briefly described above, it may be more readily comprehended by consulting the following detailed description in conjunction with the appended drawings, in which.

Figure 1:
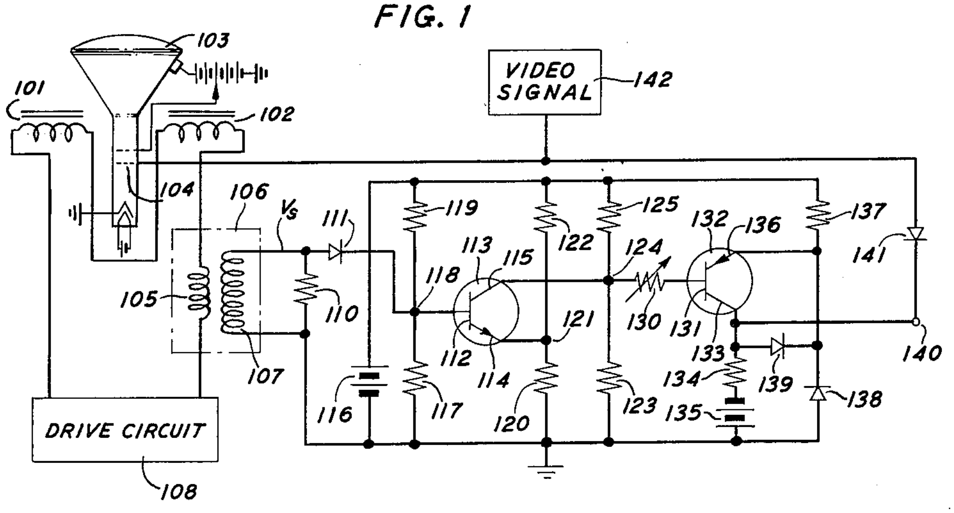
FIG. 1 is a schematic circuit, partially in block diagram form, of a preferred embodiment of the present invention.

Referring to FIG. 1, there is depicted a pair of deflection coils 101 and 102 that are utilized for the horizontal deflection, for example, of an electron beam developed within the cathode ray tube 103. Although the invention is to be described with reference to the horizontal or line sweep deflection circuit, it is not so limited, and may be applied equally as well to the vertical or frame sweep deflection circuit.

Figure 2:
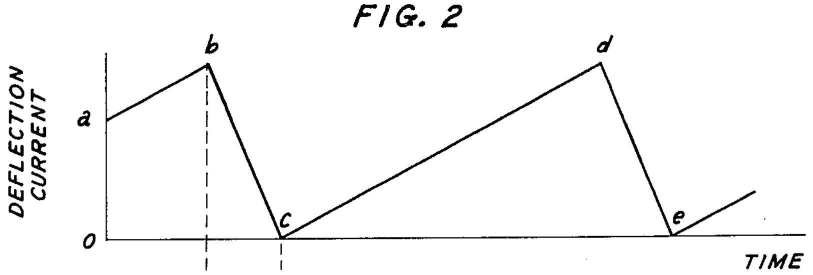
FIG. 2 is a waveform diagram of a typical sawtooth current supplied to the beam deflection coils of a cathode ray tube.

A drive circuit 108 of conventional design is employed to energize the deflection coils 101 and 102, its output typically consisting of a series of voltage pulses that give rise to the flow of a current of sawtooth waveform in the deflection coils. A typical waveform of this current is depicted in FIG. 2. The portions of positive slope, *a—b, c—d,* produce the active line sweeps of the beam across the face of the cathode ray tube, while the portions of negative slope, *b—c, d—e,* produce retrace sweeps that return the beam across the face of the tube from the end of one line sweep to the beginning of the next. The magnitude of the slope of the wave is proportional to the velocity of the beam.

Figure 3:
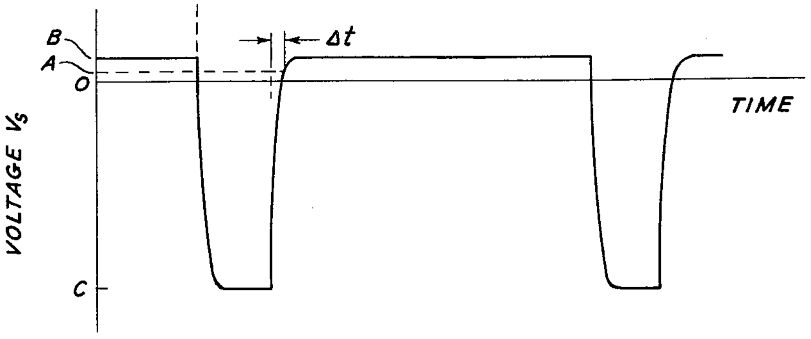
FIG. 3 is a waveform diagram of the output voltage of one of the circuit elements of FIG. 1.

In order to sample the deflection circuit current, i.e., to determine the slope of the waveform of FIG. 2, the primary winding 105 of a transformer 106 is placed in series with the deflection coils. A detailed consideration of the selected transformer parameters will be given hereinafter. FIG. 3 depicts the waveform of the potential, $V_s$, developed in the secondary winding 107 of transformer 106. This potential, which is equal to the product of the coefficient of mutual coupling between windings 105 and 107 and the rate of change of current in winding 105, is completely characteristic of the deflection of the electron beam. That is, a positive potential is produced during active scanning periods, characterized by the positive slope of the sawtooth current of FIG. 2. Similarly, a negative potential is produced during retrace intervals, characterized by a deflection circuit current of negative slope. The absolute magnitude of the developed potential is proportional to the deflection speed of the electron beam.

It is advantageous to utilize a transformer as the sampling element for a number of reasons. First, by inserting the primary winding 105 in series with the deflection coils 101 and 102, faults may be detected and compensated for whether occurring in the coils themselves or in the drive circuit 108. Second, the potential of the secondary may be put at any convenient reference level without affecting the primary circuit. And third, the transformer develops a desired potential in its secondary with less loading of the deflection circuit than does a single inductive coil.

The secondary winding 107 of the sampling transformer 106 is coupled by means of a diode 111 to an amplifier that comprises a pair of direct coupled transistor stages. The output terminal 140 of the amplifier is in turn coupled through the unidirectional current device 141, which may be a diode, for example, to the beam intensity control grid 104 of cathode ray tube 103. When the potential developed in the secondary winding 107 is greater than a predetermined positive value of A volts, which corresponds to a sweep speed during active scanning sufficient to prevent burning of the screen, both stages of the amplifier are fully conducting, and the potential of the output terminal 140 is positive. Threshold level A is illustrated in FIG. 3 in relation to the potential developed in the secondary winding 107. The positive potential of terminal 140 is chosen to be greater than the most positive potential that is received from the video signal source 142, so that diode 141 is normally reverse biased and, hence, nonconducting. The potential of the grid 104 is thus regulated solely by the signal from source 142. However, if the potential developed in the secondary winding 107 becomes less than A volts, for example, upon a complete scanning circuit failure or during retrace intervals and those times when the beam deflection speed in active scanning intervals is insufficient to prevent burning, both stages of the amplifier become nonconducting, and the potential of the output terminal 140 accordingly is negative. In this condition diode 141 is forward biased and hence conducting, clamping the control grid 104 at the negative potential of the output terminal 140. The beam of cathode ray tube 103 is consequently effectively blanked.

The amplifier produces the positive and negative control potentials at terminal 140 in the following manner. Transistor 113, which conveniently may be of the NPN type, is biased through the action of resistors 120 and 122. These resistors, which are connected across a suitable source of potential 116 and together at a junction point 121, serve to bias the emitter 114 of transistor 113 at a positive potential slightly less than the selected threshold level of A volts, i.e., at a potential of $A-\Delta A$ volts. Accordingly, in order to initiate conduction in transistor 113, the potential of its base 112 must be greater than $A-\Delta A$ volts. The base potential is normally established by the potential, $V_s$, developed in the secondary winding 107 of transformer 106 which is coupled to the base by the diode 111. The voltage drop across the diode is normally negligible and may be neglected in this analysis. However, when the potential developed in the secondary winding is less than $A-\Delta A$ volts, diode 111 is generally nonconducting, and the potential of the base 112 is determined by the voltage dividing action of resistors 117 and 119, which are connected across the potential source 116 and are attached at their junction point 118 to the base 112. These resistors are proportioned to maintain transistor 113 normally in a state of nonconduction.

When transistor 113 is nonconducting, i.e., when the potential developed in secondary winding 107 is less than $A-\Delta A$ volts, a high impedance exists between collector 115 and emitter 114. The potential of collector 115 is thus effectively determined by the voltage dividing action of resistors 123 and 125, which bridge the source 116 and are tied at their junction point 124 to collector 115.

The junction 124 is also coupled by means of adjustable resistor 130 to the base 131 of transistor 132. Transistor 132 may conveniently be of the PNP type. The resistors 123 and 125 are proportioned such that the potential of junction 124 is, for the cut-off condition of transistor 113, more positive than the potential of the emitter 136 of transistor 132. Accordingly, transistor 132 is in a state of nonconduction at the same time that transistor 113 is nonconducting, and a high impedance exists between the emitter 136 and collector 133 of transistor 132.

In this condition, the potential of emitter 136 is established by the positive potential of source 116 coupled to emitter 136 by resistor 137, limited, however, by the breakdown action of diode 138 connected between the emitter and the negative terminal of source 116, e.g., ground. The potential of collector 133, and consequently the potential of terminal 140, are held in a negative potential condition by the negative source of potential 135 coupled through resistor 134 to the collector 133. The negative potential of collector 133 is limited, however, by the action of diodes 138 and 139. That is, this potential does not fall below the positive potential of emitter 136 by more than the breakdown potential of the diode 139 connected between collector 133 and emitter 136. And, as noted above, the positive potential of emitter 136 is limited by the breakdown potential of diode 138.

On the other hand, when the potential developed in secondary winding 107 of transformer 106 is greater than $A-\Delta A$ volts, diode 111 conducts and establishes the base 112 of transistor 113 at the potential of the secondary winding. Transistor 113 thus commences to conduct, and the impedance between collector 115 and emitter 114 is greatly reduced. Hence, the potential of collector 115 experiences a rapid fall toward the potential of point 121. This fall in potential is communicated through resistor 130 to the base 131 of transistor 132, and results in the base 131 being biased negatively with respect to the emitter 136. Transistor 132 thus commences to conduct, and the impedance between collector 133 and emitter 136 is greatly reduced. As transistor 132 increases in conduction, due to an increase in the conduction of transistor 113, which is in turn caused by a further increase in the developed potential of secondary winding 107, the potential of collector 133 rises toward the positive potential of emitter 136. The parameters of the circuit may be chosen so that conduction in transistor 132 is at a maximum, i.e., saturated, when the potential developed in the secondary winding 107 is greater than A volts. At saturation, the potential of the collector 133 is positive and is effectively that of the emitter 136.

It thus may be seen that when the potential developed in winding 107 is greater than A volts, transistor 132 is fully conducting, and the potential of its collector 133 is at a positive potential. When the potential developed in winding 107 is less than $A-\Delta A$ volts, however, both transistors 113 and 132 are nonconducting, and the potential of the collector 133 of transistor 132 is at a negative potential. By adjusting the magnitude of gain controlling resistor 130, i.e., by making the over-all gain of the circuit large, the difference between A and $A-\Delta A$ volts may be made arbitrarily small, and the potential of terminal 140 may be made either positive or negative depending upon whether the potential developed in the secondary winding 107 is greater than or less than A volts. As pointed out above, when terminal 140 is negative, diode 141 conducts, clamping the control grid 104 of the cathode ray tube at a negative potential and blanking the beam. When the terminal 140 is positive, diode 141 is open circuited, and the potential of the control grid of the cathode ray tube is controlled solely by the signal from source 142. Since the voltage produced in the secondary winding 107 is less than A volts only when the rate of deflection of the beam during line sweep is either entirely absent, insufficient to prevent burning of the screen, or during flyback, the beam is blanked at all of these times.

By adjusting resistor 130 so that the over-all gain of the circuit is relatively low, the difference between A and $A-\Delta A$ volts may be made quite large. In this case the device will not be strictly binary in its operation, since beam intensity changes, through intermediate values, from fully on to fully off with the relatively large range of $\Delta A$ volts. In this fashion beam intensity is made proportional to sweep speeds within this range; this may be utilized to maintain constant screen luminescence independent of sweep speeds.

Since the breakdown voltage of diode 138 limits the positive potential of the emitter 136 of transistor 132, and the breakdown voltage of diode 139 limits the negative potential of the collector 133 when transistor 132 is nonconducting, the "on" and "off" potentials of collector 133 may be adjusted by varying the selection of diodes employed. The potential of emitter 136 and, thus, the "on" potential of collector 133 should be more positive than the most positive value that the video signal will assume. In this fashion diode 141 is open circuited during normal line sweep, and the potential of the collector 133 does not limit the voltage of the control grid 104.

The response time of the above-described embodiment of the present invention constitutes, to a great extent, the most important factor to be considered in choosing the particular values for the components utilized in the device. In this respect, the parameters of transformer 106 largely determine the response time, since the transistorized portion of the circuit of FIG. 1 utilizes no capacitors and thus has, effectively, an instantaneous response.

In computing the parameters of the transformer 106, it is advantageous to refer to FIG. 3. In the figure the potential, $V_s$, developed in the secondary winding 107 changes in exponential fashion from a value of C volts after flyback, e.g., at the instants corresponding to *c* and *e* of FIG. 2, to B volts during line sweep. Since blanking of the beam occurs so long as the potential developed in the secondary winding is less than A volts, it is necessary, for some applications, that the developed potential swings from C volts to at least A volts within a predetermined time, e.g., $\Delta t$, measured from the end of retrace. For example, in utilizing the present invention to provide, in conventional television circuits, protection against screen burnout due to deflection circuit failure and automatic blanking during retrace, it is necessary for the potential developed in the secondary winding 107 to change from C volts to A volts or greater within the blanking interval present in the video signal. In this fashion the device does not blank the beam during the time that picture information is present in the signal.

The equation governing the potential developed in the secondary winding 107 for the interval during which the potential swings from a value of C volts, immediately after retrace, to approximately B volts, during line sweep, may be expressed as follows:

$$V_s=(C-B_{\epsilon}{}^{-t/\tau}+B \qquad (1)$$

where, referring to FIG. 3, $V_s$ is the potential, in volts, developed in the secondary winding 107; C and B are the values of potential developed during retrace and line scanning, respectively; $\tau$ is the time constant in seconds of the circuit that includes the secondary winding 107; and *t* is the independent variable, time, measured in seconds from the end of the retrace interval. The time constant $\tau$ is given by the equation:

$$\tau=\frac{L_s}{R_s} \qquad (2)$$

where $L_s$ is the inductance, in henries, of the secondary winding 107, and $R_s$ is the resistance, in ohms, of the circuit that includes the secondary winding 107. Since the diode 111 is effectively open circuited during the entire swing of the potential $V_s$ from C volts to A volts, the resistance $R_s$ is that of the winding 107 and resistor 110 connected across winding 107.

Substituting $L_s/R_s$ from Equation 2 for $\tau$ in Equation 1, Equation 1 may be solved for $L_s$ to give:

$$L_s=\frac{R_s t}{\log_\epsilon\left(\frac{C-B}{V_s-B}\right)} \qquad (3)$$

In order to ensure that the beam becomes unblanked within the interval $\Delta t$, the desired value of $L_s$ may be determined from Equation 3 by substituting the value of A volts for $V_s$ and the value of $\Delta t$ for *t*. Having computed a suitable value of secondary inductance $L_s$ from Equation 3, the inductance, $L_p$, in henries, of the primary winding 105 may be calculated from the equation:

$$L_p=\frac{V_s^2}{k^2 L_s\left(\frac{di}{dt}\right)^2} \qquad (4)$$

where *k* is the coupling coefficient of transformer 106, which is normally unity; *di/dt* is the rate of change of current in amperes per second in the primary winding 105, which may be obtained from FIG. 2 during active line scanning; and $V_s$ is the corresponding potential developed in the secondary winding 107, i.e., B volts.

At this point it should be noted that the speed of response of the transformer 106 may be limited by the resonant frequencies of its windings 105 and 107 as well as by the time constant $\tau$. In the case of high speed scanning and in conventional television broadcast practice, the interwinding and wiring capacitances of primary winding 105 and secondary winding 107 largely determine the resonant frequency and hence response time of the transformer. For application in this area, the inductances of these windings should be kept to a minimum to reduce the response time. Practical values of inductances may be selected which satisfy this requirement and yet produce an adequate output potential from secondary winding 107.

While the above-described embodiment is shown as affecting the voltage of the beam intensity control grid of a cathode ray tube, it may be applied equally as well to the regulation of the cathode voltage. In such a case the connections of either the primary winding 105 or the secondary winding 107 of transformer 106 are reversed, as are the connections of diodes 111 and 140, to provide a polarity opposite to that as shown in FIG. 1. In this case beam blanking occurs when transistors 113 and 132 are fully conducting. In this respect it should be noted that, for low speed scanning, although Equations 1, 2, 3 and 4 above are applicable, the value of $R_s$ in Equations 2 and 3 will be effectively governed by the input resistance of the transistor amplifier of FIG. 1, since, in this case, diode 111 conducts during the swing of the potential $V_s$ from the blanking to the unblanking condition.

Although the invention has been described primarily for regulating the intensity of the electron beam in a cathode ray tube in which the beam is deflected by a changing magnetic field, it is not limited in this respect. In fact, the same principles apply in the case of electrostatic deflection, i.e., the rate of change of voltage across the deflection plates may be utilized by a circuit similar to that depicted in FIG. 1 to provide beam blanking in the event deflection speed falls below a predetermined magnitude and to provide automatic blanking during flyback. Accordingly, although various modifications and changes may be made in the above-described embodiment, these lie well within the spirit and scope of this invention.

What is claimed is:

1. In a cathode ray tube utilizing deflection coils for beam deflection, means for regulating the intensity of the cathode ray beam in accordance with its direction and rate of deflection comprising means for sampling the rate of change of deflection coil current, said last-named means comprising a transformer whose primary winding is connected in series with said deflection coils, a direct current amplifier comprising an input stage and an output stage, means for coupling the secondary winding of said transformer to the input of said amplifier, means for biasing the input stage of said amplifier so that conduction in said stage commences only when a first predetermined input potential is established, means for varying the gain of said amplifier so that conduction in said output stage is saturated when a second predetermined input potential is established, and means for coupling the output potential of said amplifier to a control element that varies beam intensity in proportion to the magnitude of an input signal.

2. Apparatus for automatically regulating the intensity of an electron beam comprising a cathode ray tube, means for developing a beam of electrons within said tube, means for developing a varying magnetic flux in order to deflect said electron beam, said last-named means comprising a coil placed in proximity to said beam and means for providing a passage of current of varying magnitude through said coil, control means having an input circuit for varying the intensity of said beam in proportion to the magnitude and polarity of an input signal, a source of video signals coupled to the input circuit of said control means, means for developing a potential proportional to the rate of change of current in said coil, said last-named means comprising a transformer having a primary winding and a secondary winding, said primary winding being electrically connected in series relationship with said coil, means coupled to said secondary winding for producing a first potential when the potential developed in said secondary winding is of a first polarity with respect to a predetermined threshold potential and for producing a second potential when the potential developed in said secondary winding is equal to a selected second polarity with respect to said predetermined threshold potential, means responsive to said first potential for coupling said first potential to said input circuit of said control means to blank said beam, and means responsive to said second potential for isolating said control means from any other signal except that from said source of video signals.

3. Apparatus for automatically regulating the intensity of a beam of electrons in accordance with the rate and direction of deflection of said beam comprising control means for varying the intensity of said beam in accordance with an input signal, a source of video signals connected to said control means, means for deflecting said beam alterately in a first and a second direction, means for detecting the rate and direction of deflection of said beam, means responsive to said detention means for developing a first potential when said rate of beam deflection in said first direction exceeds a predetermined threshold, means responsive to said detection means for developing a second potential when said rate of beam deflection in said first direction is not greater than said predetermined threshold, means responsive to said detection means for developing said second potential when said beam is deflected in said second direction, the magnitude of said second potential being selected to reduce the intensity of said beam to a predetermined level when said second potential is applied to said control means, means responsive to said first potential for isolating said control means from all signals except those from said source of video signals, and means responsive to said second potential for coupling said second potential to said control means.

4. Apparatus for automatically regulating the intensity of an electron beam comprising a cathode ray tube, means for developing a beam of electrons within said tube, control means associated with said cathode ray tube for varying the intensity of said beam in proportion to the magnitude and polarity of an applied signal, means for deflecting said beam across an area forming the face of said tube, said beam deflecting means comprising in combination a coil placed in proximity to said beam and means for passing a current of varying magnitude through said coil, means for sampling the rate of change of current in said coil, said current sampling means comprising a transformer having a primary winding and a secondary winding, said primary winding being connected in series relationship with said beam deflecting coil, a direct coupled amplifier, means for coupling said secondary winding to the input of said direct coupled amplifier, a unidirectional current device coupling the output of said amplifier to said control means, a source of video signals coupled to said control means, said amplifier being characterized in that its output assumes a first potential when the potential developed in said secondary winding is of a first polarity with respect to a predetermined threshold potential, said output assuming a second potential when the potential developed in said secondary winding is at least of a second polarity with respect to said predetermined threshold potential, the magnitude and polarity of said first potential being chosen so that it biases said unidirectional current device in a forward direction, causing said unidirectional current device to conduct and establish said control means at said first potential, thereby blanking said beam, the magnitude and polarity of said second potential being chosen so that it biases said unidirectional current device in a reverse direction causing said unidirectional device to be nonconductive, whereby the potential of said control means is established by said video signal.

5. In an electron beam device in which a beam is deflected in a pre-established pattern over a given area, means for blanking said beam both during retrace sweeps of said beam and when the speed of said deflection falls below a predetermined value comprising energizing means for developing said beam, means responsive to an energizing current for deflecting said beam, means for sampling said energizing current and producing a control voltage proportional to the rate of change of said energizing current, means responsive to said control voltage for producing a pre-established potential when said control voltage is of a predetermined polarity with respect to the reference potential, said last-mentioned means comprising a direct-current amplifier having an input directly coupled to said means for sampling said energizing current, said amplifier being biased to provide a potential at its output which is maintained at a predetermined value when the potential applied to said input is of said predetermined polarity with respect to said reference potential.

6. Apparatus in accordance with claim 5 wherein said means for sampling said energizing current comprises a transformer having a primary winding and a secondary winding, said primary winding being connected in series relation with said means responsive to an energizing current for deflecting said beam.

7. Apparatus in accordance with claim 5 wherein said direct-current amplifier comprises an input stage and an output stage, and means for directly coupling said stages and for varying the gain of said amplifier to provide a state of conduction in said output stage which is saturated when said means for providing a voltage proportional to the rate of change of said energizing current is of a predetermined polarity with respect to said reference potential.

References Cited in the file of this patent

UNITED STATES PATENTS

| | | |
|---|---|---|
| 2,098,384 | Goodrich | Nov. 9, 1937 |
| 2,222,426 | White et al. | Nov. 19, 1940 |
| 2,709,768 | King | May 31, 1955 |